May 27, 1930.    A. DOW    1,760,483
METHOD AND APPARATUS FOR POWER TRANSMISSION AND RELEASE
Filed Oct. 14, 1927    4 Sheets-Sheet 1

INVENTOR.
Alexander Dow
BY James L. Stewart
ATTORNEYS.

May 27, 1930.  A. DOW  1,760,483
METHOD AND APPARATUS FOR POWER TRANSMISSION AND RELEASE
Filed Oct. 14, 1927    4 Sheets-Sheet 2

INVENTOR.
Alexander Dow
BY James L. Stewart
ATTORNEYS.

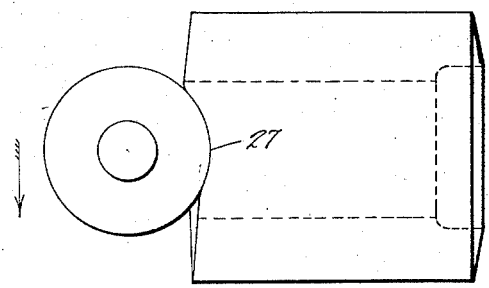
Fig. 5
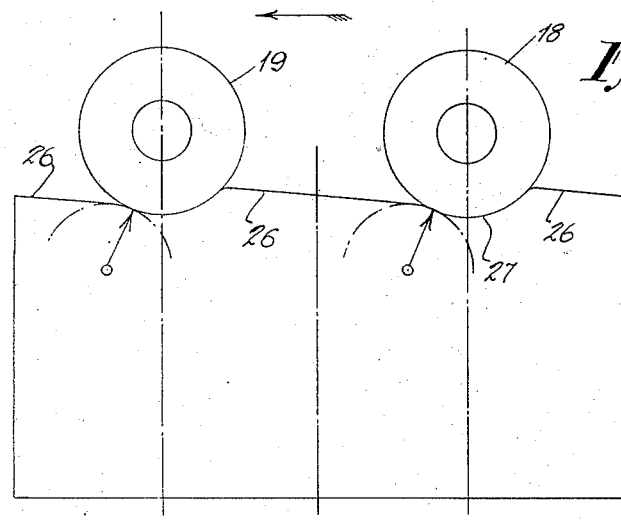
Fig. 6
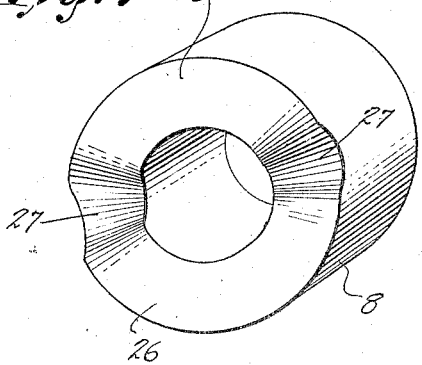
Fig. 7
Fig. 8
INVENTOR.
Alexander Dow
BY James L. Stewart
ATTORNEYS.

May 27, 1930.                A. DOW                1,760,483
METHOD AND APPARATUS FOR POWER TRANSMISSION AND RELEASE
               Filed Oct. 14, 1927        4 Sheets-Sheet 4
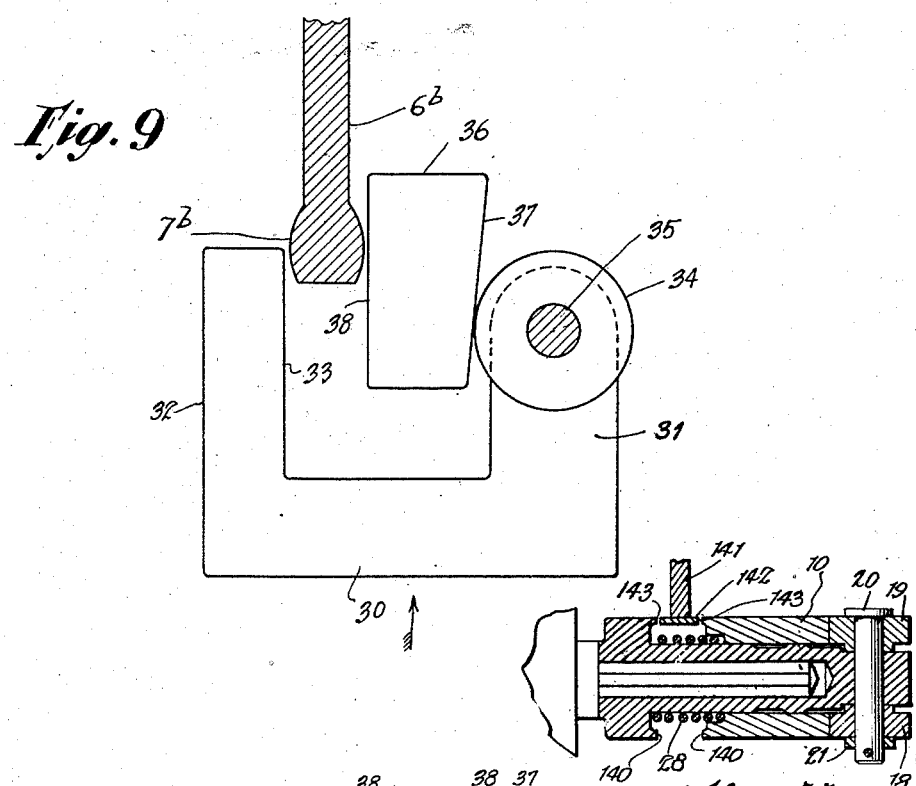
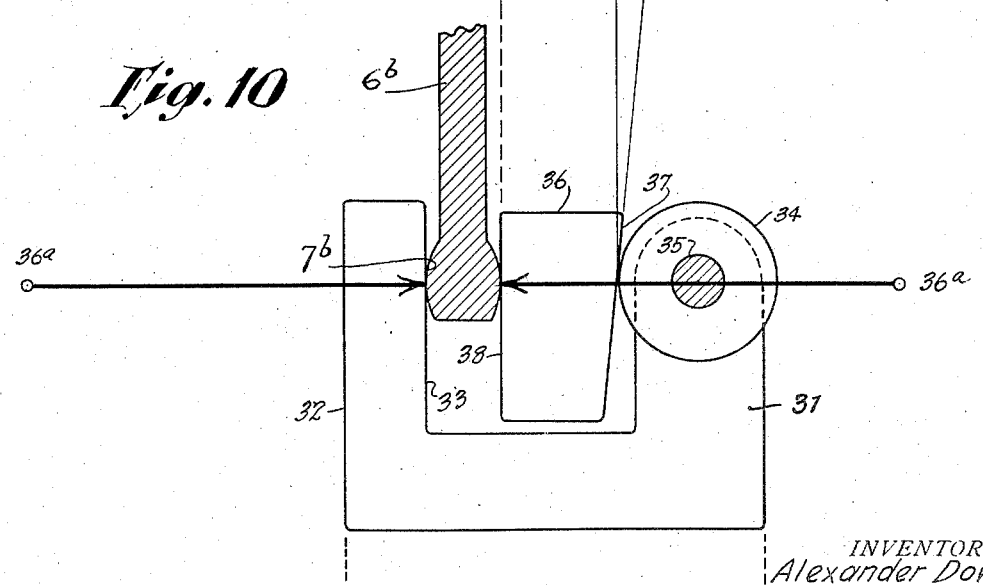
INVENTOR.
Alexander Dow
BY James L. Stewart
ATTORNEYS.

Patented May 27, 1930

1,760,483

UNITED STATES PATENT OFFICE

ALEXANDER DOW, OF NEW YORK, N. Y., ASSIGNOR TO DOW PATENTS HOLDING CORPORATION, A CORPORATION OF DELAWARE

METHOD AND APPARATUS FOR POWER TRANSMISSION AND RELEASE

Application filed October 14, 1927. Serial No. 226,170.

This invention relates to the art of power transmission and control. It has to do particularly with means and mechanisms including the operation of a method for accomplishing a clutch between driving and driven elements. That particular phase of the invention which has to do with the transmission of power through the medium of a clutch described herein may pertain to a variety of uses and purposes. In fact, wherever it is desirable to transmit power through the medium of a driving and a driven element, the principles involving the clutch mechanism of this invention may be employed. It is also applicable for cooperation with devices where the clutch element is so constituted as to cooperate with other mechanisms adapted to loosen the clutch and cause the same to be again operative, dependent upon variations in the load carried by the driving element, or it may be associated with devices adapted to engage and release the clutch under any prescribed conditions. The invention herein disclosed and claimed is intended to be commensurate with any of the various applications to which it may be applied.

One embodiment of said invention will be disclosed in this application as the same pertains to devices for starting internal combustion engines, the same being adapted to cooperate with that class of engine in the first instance to apply the force of a prime mover, such as an electric motor, to operate the device to engage a driven element such as the fly-wheel of a gas motor, and thus to cause said fly-wheel to rotate in a manner to start the combustion engine in its cycle of operation; and then, as the momentum of the engine exceeds the momentum of the prime mover, the elements involved cooperate to disengage the driving from the driven mechanism by the release of a clutch interposed, thus permitting the combustion engine to rotate without further cooperation on the part of the prime mover.

Said invention in its broad application and also in its specific application to self starters, is illustrated in the accompanying drawings and described by reference to index numerals, like parts being indicated by like numerals.

Figure 5 is a detail of one of the combined elements, exhibiting the same in association with a roller, with which it is adapted to cooperate.

Figure 6 is a diagrammatic view showing the relation of certain cams and rollers, such diagram illustrating the relation of certain cams and rollers as projected in one plane.

Figure 7 is a perspective view of the element exhibited in Figure 5.

Figure 8 is a diagrammatic illustration of the annular surfaces of a fly-wheel adapted to be interposed between the walls of a clutch.

Figures 9 and 10 are diagrammatic views introduced for the purpose of illustrating the operation of the clutching elements employed and the cooperative forces involved.

Figure 11 is a vertical section of the starter mechanism, illustrating another form in which the engaging faces of the clutch may cooperate with corresponding engaging faces carried by the driven element.

As previously stated, a self starter for internal combustion engines must involve means for transmitting power from a driving to a driven element, through the medium of some form of power transmission, and it must also provide for the release of such power transmission connection when the speed of the gas engine exceeds that of the prime mover. The operation of transmitting power from a prime mover operating a driving element to a driven element will first be described, and the releasing operation subsequently disclosed.

Figure 1:
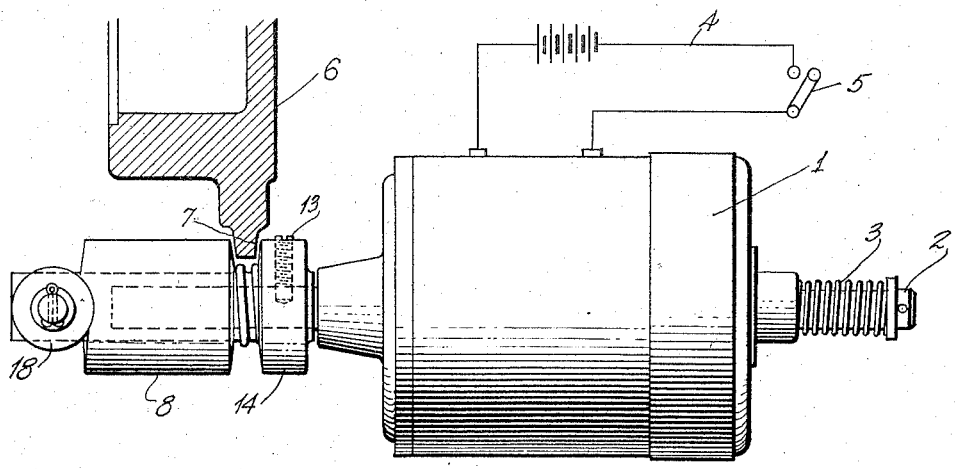
Figure 1 is a side elevation, exhibiting a starter in association with the fly-wheel of a combustion engine, the latter being illustrated in section. Electrical connections are shown in diagrammatic form.
Figure 2:
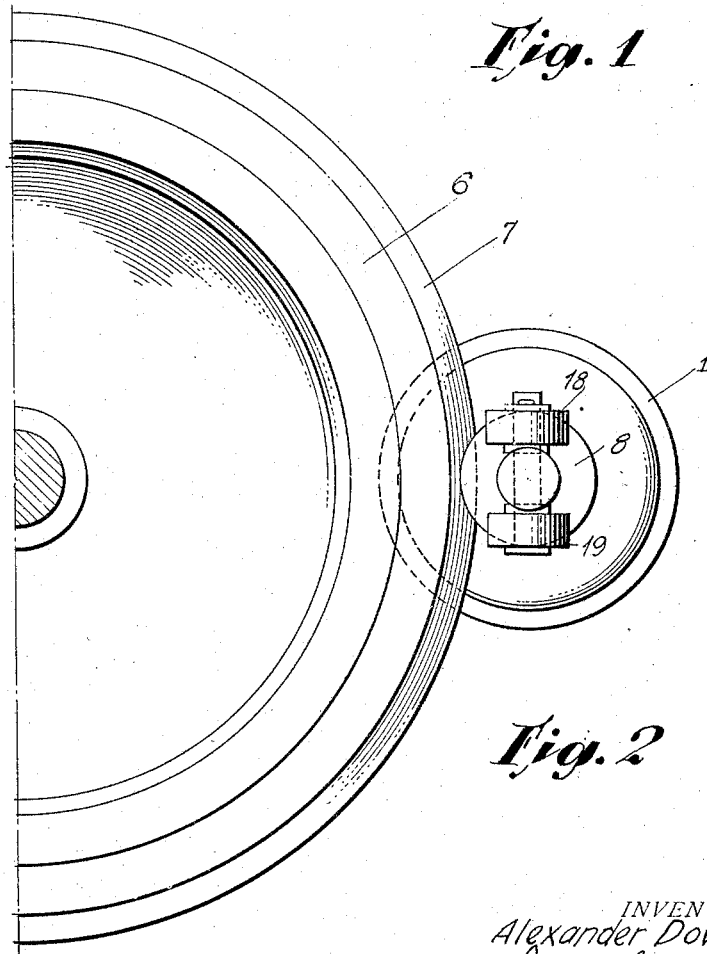
Figure 2 is an end view in elevation of Figure 1.

Referring to Figures 1 and 2, 1 indicates an electric motor, which in this case is employed preferably as a prime mover. 2 is the armature shaft of the motor and 3 a spring interposed to regulate the position of the armature according to well understood electric laws. 4 is an electric circuit, including the motor 1, and controlled by a switch 5. 6, in Figure 1, is a sectional view of the fly-wheel of a combustion engine, while 7 is an annular element formed on the periphery of said fly-wheel adapted to cooperate with the faces of a clutch hereinafter to be described. 8 designates generally a clutch mechanism which will be described in detail.

Figure 2 represents an end view of the starter, as associated with the fly-wheel of the combustion engine. 6 is the fly-wheel and 7 the peripheral engaging surface. 1 is the motor and 8 the starter mechanism. The details thereof will be subsequently described.

Figure 3:
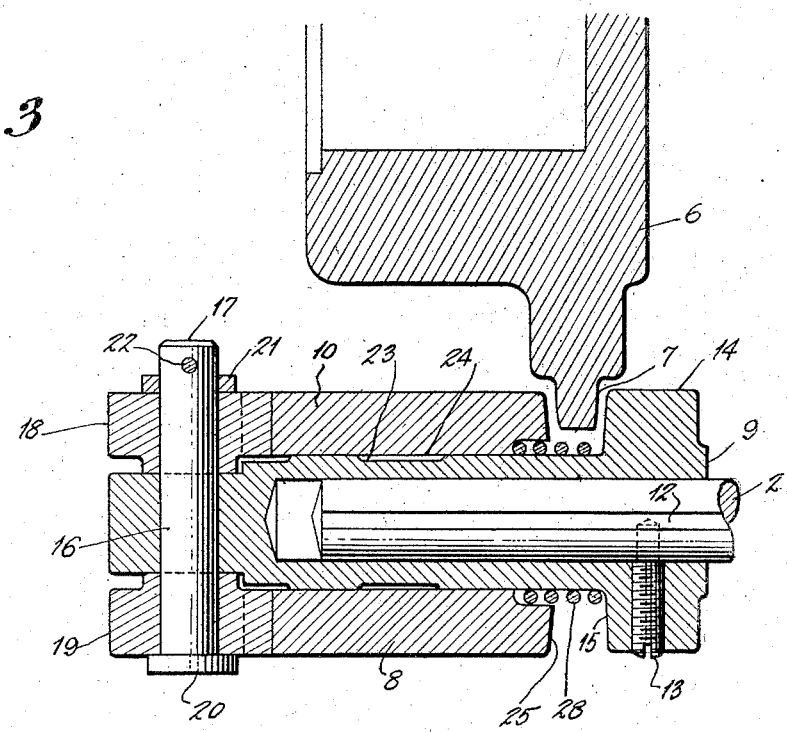
Figure 3 is a vertical section of a specific embodiment of a combustion engine starter, illustrating the same with the clutch mechanism disengaged.
Figure 4:
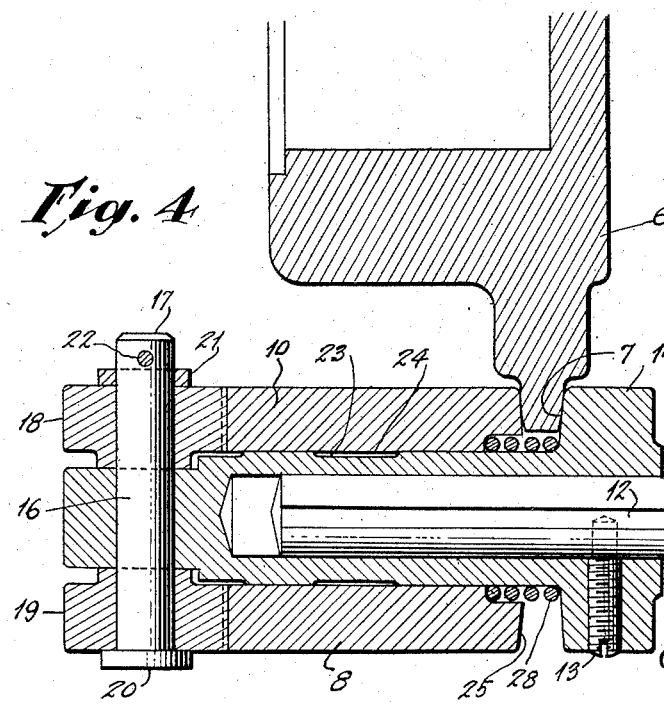
Figure 4 is similar to Figure 3, except that the clutch mechanism is shown in engagement.

Figures 3 and 4 illustrate the starter mechanism, Figure 3 exhibiting the jaws of the clutch as open, and Figure 4 showing the same as closed. This device embodies two essential elements which are characterized as sleeves. One of said sleeves is designated as 9 and the other as 10. The sleeve 9 is bored axially as at 11 to be run on the motor shaft 2 and to be keyed thereto to partake of the rotary motion thereof as by means of a key slot 12, so that said sleeve 9 may have an axial movement on the shaft 2, as shown in Figure 11. In the specific instance where an electric motor is used, it may be preferable to lock said sleeve 9 to the shaft 2 by a suitable screw as 13, as shown, for example, in Figures 1, 3 and 4, as there is sufficient end play in the armature shaft of an electric motor to allow of proper operation of the device. Thus the sleeve 9 may be mounted to either slide longitudinally on the shaft, or said sleeve 9 may be locked to the shaft by the screw 13 as stated, to axially move with the shaft. These arrangements are optional, as stated, and are mechanical equivalents within the purview of this invention. Where the sleeve 9 is locked to the shaft 2 by such a screw 13, it is possible to utilize the thrust of the armature shaft to cause one face of the clutch to be brought into juxtaposition with one face of the driven element, but under normal conditions it is desirable that the sleeve 9 be free to move axially of the shaft 2. The sleeve 9 at one end has an annular enlargement 14. This enlargement is provided with a face 15, which is one of the cooperative faces of the clutch hereinafter referred to. At the opposite end of said sleeve 9 is provided an aperture 16 adapted to receive a shaft 17 on which are mounted rollers 18 and 19, the same being held in position by the boss 20 and washer 21 and cotter pin 22. The external periphery of the sleeve 9 forms a bearing surface 23. The sleeve 10 is axially bored, presenting an internal surface 24, to fit on the exterior bearing surface 23 of the sleeve 9; said sleeve 10 is provided at one end with a clutching surface as 25, which is oppositely disposed to the clutching surface 15 of the sleeve 9. The end of said sleeve 10, opposite to that having said clutching surface 25, is provided with two oppositely disposed helical cam surfaces designated as 26, 26. Intermediate the termini of the said cam surfaces are provided indentures 27, 27. The rollers 18 and 19 are adapted normally to rest within the indentures 27 and 27, and to roll respectively on said cam surfaces 26, 26. The sleeve 10 is free to rotate on its said bearing 23 and also free to move axially on said bearing. Elastic means, as a spring 28, is interposed between said sleeves 9 and 10 with its tension normally directed to keep the oppositely disposed jaws 15 and 25 separated. The sleeve 10 is constructed of sufficient weight and volume to normally present within itself an inertia opposed to any active force tending to rotate the same, as for instance, the friction of the said sleeve 10 on its bearing 23, or the tendency to rotate the same due to the operation of the rollers 18 and 19 moving on said cam surfaces 26, 26, or as opposed to any other active force tending to rotate the same, as for instance its contact with the spring 28.

The inherent inertia of said sleeve 10 is deemed to be of importance in the operation of the elements hereinafter described as cooperating to accomplish the result desired, for it is essential that said sleeve 10 should momentarily remain stationary while the rollers are riding on the cams to impart an axial movement to the said sleeve.

Concerning the clamping jaws or surfaces 15 and 25, it is found desirable that these faces should be in conical form at an angle of approximately 3° to the axis of said sleeves. Satisfactory results have been attained under these conditions, but it is not regarded as essential that they should be of conical form; they may be parallel. Where they are of conical form, it is desirable that the engaging periphery 7 of the fly-wheel 6 should be cut at a corresponding angle, as illustrated in Figure 8. In this figure a construction is shown wherein a point of contact is established in the arc of a circle as at 29. It is deemed desirable that such point of contact be restricted within narrow limitations, but it is essential that the oppositely disposed planes of the gripping faces 15 and 25 should be in corresponding parallel planes with the driven faces of the periphery of the driven wheel in order that satisfactory gripping surfaces may be presented to the clutching and confined elements.

With respect to the cam surfaces 26 and 26, and their relation to the rollers 18 and 19 and the stud 17 in the construction shown the best results have been attained when the helical cam surfaces are cut at an angle of 7° to a plane perpendicular to the axis of said sleeve 10, but it is desirable that the relation of the said cam surfaces to the size of the rollers 18 and 19 and to the size of the stud 17 should be such that the degree of pressure exerted by the stud and rollers on the cams as constituted in the construction shown should be equal to the operation of said rollers and stud on a cam cut at an angle of 7°. It will be understood that the same results will be obtained if the rollers and studs were of different diameter and the cams cut at a different angle. It is only desired here to point out this possible variation, and it is only intended to convey the idea that under the construction shown in the drawings which are to scale a 7° cam operates with the most desirable efficiency; but as previously stated, the same desirable efficiency may be obtained by varying the relation of the stud, the rollers, and angle of the cams. The operation of the device therefore has been found to be most efficient under the conditions named. The law of the relation of these parts is described with the purpose of including variations of said angle and said cams and the relation of the rollers and stud as equivalent structures.

In like manner, it will be understood that while in the construction shown the rollers are carried by the sleeve 9, they might with the same efficiency be carried by the sleeve 10, and the cams form part of the structure of the sleeve 9.

For the purpose of graphically illustrating the position of the rollers with reference to the cams in Figure 6, the cams have been laid out in a plane showing the rollers in cooperation therewith. From this drawing it will be seen that the rollers normally rest in the seat 27 and with the rotation of the driving shaft they are rolled upwardly on the cams 26. The diagram shows one complete cam, whereas the other cam is divided into two sections.

The operation of the device is as follows: When the circuit 4 is closed by the operation of the switch 5 the motor is caused to rotate, and if the thrust of the motor shaft is employed as previously stated in the operation of the device the sleeve 9 is axially moved towards the face 7 of the periphery of the flywheel. The rotation of said shaft 2 causes the sleeve 9 to rotate, carrying with it the rollers 18 and 19, which immediately begin to ride on the cams 26. The inherent inertia of the sleeve 10 resists momentarily the friction occasioned by the rotation of its bearing, and also the tendency to rotate said sleeve, due to the fact that the rollers are advancing on the cams, thus retarding the movement of the sleeve 10 so that the rollers will have time to advance on said cams. As the rollers advance on the cams, they first rise out of their seat 29, and then proceed along the path of said cams to a point adjacent the termini of such cams. This operation causes the sleeve 10 to be moved axially on its bearing, and also tends to cause the sleeve 9 to move axially on its bearing, the two movements being oppositely disposed, said latter movements causing said gripping faces 15 and 25 to approach each the other, and to grip between them the side walls of the periphery 7 of the fly-wheel 6, thus establishing a clutch relation between said peripheral extension 7 and such clutch faces 15 and 25. Under such conditions the driving element receiving its torque from the electric motor causes the driven element, to wit, the fly-wheel 6, to partake of said motion and revolve therewith, thus imparting motion to the internal combustion engine with which said fly-wheel is associated, and causing the cycle of movement within said engine in the usual manner, hence driving the fly wheel 6 by the independent power of the combustion engine and normally at a rate of speed greatly in excess of that imparted by the electric motor when operating as the driving element. Hence the velocity of the fly-wheel 6 is greater than that of the gripping faces 15 and 25, and this operation causes the gripping faces 15 and 25 to retrograde. Hence in like manner the rollers retrograde on the cams and the spring 28 causes the clutching faces 15 and 25 to separate, thus accomplishing a release of the primary driving element from the primary driven element when the primary driven element is driven at a greater rate of speed than that which is imparted to the primary driving element.

The releasing operation last described may be detailed as follows. With the start of the apparatus the driven element, to wit, the flywheel, presents an inherent inertia, the same being at rest. When the clutching operation is accomplished by the rotation of the prime motor, and the rolling of the rollers on the cams, said driven element is clamped between the clamping faces 15 and 25. The torque of the electric motor is therefore directed first to accomplish said clamping operation, then to overcome the inertia of said driven wheel, and to rotate the same. When the combustion engine starts to operate, the fly-wheel first loses its inherent inertia and falls into the power of the combustion engine, from which it receives sufficient rotary force to cause the same to rotate at a rate of speed greater than that imparted to the same by the prime mover. Hence the primary resistance to the operation of the prime mover, which is primarily presented by the inertia of said fly-wheel is eliminated. Hence the torque of the prime mover has nothing to oppose its rotation, and in like manner the rollers operating on the cams have nothing to cause the same to rise on said cams. Hence the gripping operation which is due to the fact that said rollers rise on said cams is instantaneously released. Furthermore, any frictional relation that may exist between the face 25 of the sleeve 10 and the opposed face of the driven element 7 will cause said sleeve 10 to rotate with said driven element more rapidly than the rotation of the sleeve 9. Hence it will be seen that the rotation of the sleeve 10 in the direction imparted thereto by the rapid rotation of the fly-wheel will cause the sleeve 10 to rotate in the same direction as the rotation of the fly-wheel, thus causing the cams carried by the sleeve 10 to voluntarily retract from their relation to their corresponding rollers, thus accomplishing the separation of said clutching faces 15 and 25.

It will be understood that these operations are coincident and the change from the gripping to the releasing relation is instantaneous and can only be apprehended by an analysis of the various functions of the several elements which coordinate to accomplish said release.

It will also be understood that when the primary sleeve 9 is secured to the armature shaft 2 of an electric motor, the spring 3, shown in Figure 1 of the drawings, will normally hold the shaft in a position to disengage the face 15 of the primary sleeve from the part 7 of the fly-wheel. When the motor is energized, there is a tendency of the shaft to impel the face 15 into driving engagement with part 7, as stated. This is made possible by the floating character of the shaft due to the end play allowance of said shaft. This force is however negligible as compared to the dominating force resulting from the cooperation of the rollers 18 and 19 with the cam faces 26 which serves to positively draw together both of the faces 15 and 25 into tight gripping relation with the part 7 in order that the fly-wheel may be driven as described. Therefore, this preliminary utilization of the thrust of the armature shaft is merely incidental to the operation of the mechanism and will be subservient to said dominant force as stated.

In order that the theory on which this device is constructed, and the forces employed which cause it to operate may be more clearly understood, diagrammatic views 9 and 10 are submitted. While it will be apparent that no diagrammatic views can possibly illustrate all of the functions of this device, these, it is hoped, will be helpful in understanding the principles involved.

It is suggested that the elements exhibited in these diagrammatic views, Figures 9 and 10, be considered as movably mounted on a plane surface. Let 30 represent a bifurcated element having two legs, 31 and 32. 33 represents a surface, while 34 is a roller mounted on the spindle 35. 36 is a wedge shaped element having an angular face 37, and another face 38 parallel with the face 33. $6^b$ is a driven element having a head $7^b$, which head is interposed between the faces 33 and 38. In Figure 9, the clutch is exhibited as open, whereas in Figure 10 it is exhibited as closed. The wedge element 36 and the driven element $6^b$ are stationary, whereas the bifurcated element 30 is movable. With the advance of the bifurcated element in the direction of the arrow, the roller 34 will advance on the angular face 37 until it arrives at a point on said angular face where positive pressure will be exerted in the line $36^a$. It will thus be noted that when the mechanism arrives in the position shown in Figure 10, an absolutely positive force is directed in the line $36^a$ to clutch the element $7^b$ between the walls 33 and 38.

A contemplation of the foregoing will no doubt stimulate a realization that the clutch accomplished herein is different in its fundamental characteristics from an ordinary friction clutch, for the reason that the forces directed in the plane $36^a$ are absolute and positive and generate such a degree of compression as to lift the invention out of the field of friction engaging elements to bring the same into a class having a clutching function far beyond that which can be accomplished by any of the well known friction devices. In other words, the compression is such as to cause a molecular engagement of a unique and peculiar character between the driving and the driven faces, which is sufficient to eliminate all surface disturbances incident to frictional engagement, such as the presence of oil or any other foreign substance interposed between such faces.

Referring to Figure 11, a second form of construction of the clutch faces is illustrated. Instead of the cam surfaces 15 and 25 illustrated in Figures 3 and 4, cam faces may be employed in the form indicated at 140. These faces may be conical in their relation, or parallel without departing from the spirit of the invention, as previously stated. The driven element 141 in this instance is provided with a peripheral tire as 142, or the same may be integral with the driven element 141, and the edges of this tire 142 are formed at a corresponding angle to the angle of the clutching faces 140. These surfaces are designated as 143, 143, and possibly much may be found in this form of construction, due to the fact that said faces may be ground and hardened in a way to cooperate with greater efficiency. A variety of forms of construction of this nature will be obvious.

Claims:

1. A power transmission mechanism comprising a driving and a driven shaft in parallel relation, a driving shaft-mechanism mounted on the driving shaft comprising the following elements: a sleeve adapted to fit on said driving shaft and splined with respect thereto to permit an axial movement of said sleeve on said shaft, and a rotary movement with said shaft, said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cam surfaces hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, elastic means interposed between said sleeves, tending to normally separate said conical faces, the end of said second sleeve, opposite to that having said conical face, being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing surface on which said sleeve is mounted, or actuating force due to the rotation of said rollers on the said cam surfaces, a driven member fixed to said driven shaft and provided adjacent its periphery with annular conical surfaces adapted to extend between said oppositely disposed conical surfaces of the respective sleeves and shaped for line contact therewith, so that when said driven member is clamped between conical faces of the sleeves, by reason of the rotation of the driving shaft, said driven member will partake of the rotary motion of the driving shaft.

2. In a combustion engine starter and a power transmission mechanism comprising a driving shaft and a driven shaft in parallel relation, a driving mechanism mounted on the driving shaft comprising the following elements: a sleeve adapted to fit on said driving shaft and splined with respect thereto to permit an axial movement of said sleeve on said shaft, and a rotary movement with said shaft, said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cams hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, elastic means interposed between said sleeves, tending to normally separate said conical faces, the end of said second sleeve, opposite to that having said conical face, being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing surface on which said sleeve is mounted, or actuating force due to the rotation of said rollers on the said cam surfaces, a driven member fixed to said driven shaft and provided adjacent its periphery with annular conical faces adapted to extend between said oppositely disposed conical faces of the respective sleeves and shaped for line contact therewith, so that when said driven member is clamped between the conical faces of the sleeves, by reason of the rotation of the driving shaft, said driven member will partake of the rotary motion of the driving shaft, and when the driven shaft is caused to rotate faster than the driving shaft the driven member will be released.

3. In a combustion engine starter and a power transmission mechanism comprising a driving shaft and a driven shaft in parallel relation, a driving mechanism mounted on the driving shaft comprising the following elements: a sleeve adapted to fit on said driving shaft and splined with respect thereto to permit an axial movement of said sleeve on said shaft, and a rotary movement with said shaft, said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cams hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, said opposed conical faces being formed respectively at an angle of approximately three degrees to a plane perpendicular to their common axis, elastic means interposed between said sleeves, tending to normally separate said conical faces, the end of said second sleeve opposite to that having said conical face being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, said cams being formed respectively with helical surfaces taken approximately at an angle of seven degrees to a plane perpendicular to the axis of said sleeve, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing on which said sleeve is mounted, or actuating force due to the rotation of said rollers on the said cam surfaces, a driven member fixed to said driven shaft and provided adjacent its periphery with annular surfaces extending between said oppositely disposed conical faces and shaped to have line contact therewith, so that when said driven member is clamped between said conical faces of the sleeves, by reason of the rotation of the driving shaft, said driven member will partake of the rotary motion of the driving shaft, and when the driven shaft is caused to rotate faster than the driving shaft the driven member will be released.

4. In a combustion engine starter and a power transmission mechanism comprising a driving shaft and a driven shaft in parallel relation, said driven shaft being associated with a combustion engine, a driving mechanism mounted on the driving shaft comprising the following elements: a sleeve adapted to fit on said driving shaft and splined with respect thereto to permit an axial movement of the said sleeve on said shaft, and a rotary movement with said shaft, said sleeve having at one end thereof a section of greater diameter than the sleeve, said section having a driving face, a shaft carried by said sleeve perpendicular to the axis of the said sleeve at the end thereof opposite said enlarged section, two rollers mounted for rotation at the opposite ends of said shaft, said rollers adapted for cooperation with suitable cams hereinafter described, said sleeve having an external cylindrical bearing surface intermediate said enlarged section and said rollers, a second sleeve embracing said cylindrical bearing surface of said first mentioned sleeve and being free to rotate on said bearing surface and also to slide axially thereof, said second sleeve provided at one end thereof with a driving face, the said face of said first mentioned sleeve and the face of the second sleeve being oppositely disposed as driving faces adapted to cooperate with interposed driven faces forming part of a driven element hereinafter described, elastic means interposed between said sleeves tending to normally separate said driving faces, the end of said second sleeve opposite to that having said driving face being provided with cam surfaces adapted to cooperate with said rollers, said cam surfaces emanating from points respectively in a plane perpendicular to the axis of the said sleeves and developing to points in another plane parallel with said plane last referred to, said points marking the beginning and the termination of said cam surfaces, indentures in the end of the said sleeve between the points of the beginning and the termination of the respective cam surfaces, such indentures being formed in the arc of a circle and adapted to receive said rollers when at rest before they start to rise on said cam surfaces, and permitting a complete separation of the said driving faces, said second sleeve being of mass and weight sufficient to inherently present an inertia to any actuating force that may be directed to rotate the same due to the rotation of the bearing on which said sleeve is mounted, or actuating force due to the rotation of the said rollers on said cam surfaces, a driven member fixed to said driven shaft and provided adjacent its periphery with annular faces projecting between said oppositely disposed driving faces and shaped to have line contact therewith, so that when said driven member is clamped between the driving faces of the sleeves as stated, by reason of the rotation of the driving shaft, said driven member will partake of the rotary motion of the driving shaft, and when the driven shaft due to the operation of said combustion engine is caused to rotate faster than the driving shaft, the driven member will be released.

5. A power transmission mechanism comprising a driving and a driven shaft in parallel relation, a driving shaft mechanism mounted on the driving shaft comprising the following elements: a sleeve adapted to fit on said driving shaft and splined with respect thereto to permit an axial movement of said sleeve on said shaft, and a rotary movement with said shaft, said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cam surfaces hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, the end of said second sleeve opposite to that having said conical face being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing surface on which said sleeve is mounted, or actuating force due to the rotation of said rollers on the said cam surfaces, a driven member fixed to said driven shaft and provided adjacent its periphery with annular conical surfaces adapted to extend between said oppositely disposed conical surfaces and cooperate therewith, the engaging faces of said conical driving elements of the respective sleeves and shaped for line contact therewith, so that when said driven member is clamped between said conical faces, by reason of the rotation of the driving shaft, said driven member will partake of the rotary motion of the driving shaft.

6. In a combustion engine starter and a power transmission mechanism comprising a driving shaft and a driven shaft in parallel relation, a driving mechanism mounted on the driving shaft comprising the following elements: a sleeve adapted to fit on said driving shaft and splined with respect thereto to permit an axial movement of said sleeve on said shaft, and a rotary movement with said shaft, said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cams hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, the end of said second sleeve, opposite to that having said conical face, being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing surface on which said sleeve is mounted, or actuating force due to the rotation of said rollers on the said cam surfaces, a driven member fixed to said driven shaft and provided adjacent its periphery with annular conical faces adapted to extend between said oppositely disposed conical faces of the respective sleeves and shaped for line contact therewith, so that when said driven member is clamped between said conical faces of the sleeve, by reason of the rotation of the driving shaft, said driven member will partake of the rotary motion of the driving shaft, and when the driven shaft is caused to rotate faster than the driving shaft the driven member will be released.

7. In a combustion engine starter and a power transmission mechanism comprising a driving shaft and a driven shaft in parallel relation, a driving mechanism mounted on the driving shaft comprising the following elements: a sleeve adapted to fit on said driving shaft and splined with respect thereto to permit an axial movement of said sleeve on said shaft, and a rotary movement with said shaft said sleeve having at one end thereof a section of greater diameter than said sleeve, said section having an annular face of conical form, the apex of said cone lying in the line of the axis of said sleeve and directed toward the opposite end of said sleeve, a shaft carried by said sleeve perpendicular to the axis of said sleeve at the end thereof opposite said enlarged section, two rollers mounted for rotation at the opposite ends of said shaft, said rollers adapted for cooperation with suitable cams hereafter defined, said sleeve having an external cylindrical bearing surface intermediate said enlarged section and said rollers, a second sleeve embracing said cylindrical bearing surface of said first mentioned sleeve and being free to rotate on said bearing surface and also to axially slide thereon, said second sleeve provided at one end with an annular face of conical form, the apex of said cone being in the line of the axis of said sleeve and oppositely disposed with respect to said first mentioned conical face, said opposed conical faces being formed respectively at an angle of approximately three degrees to a plane perpendicular to their common axis, the end of said second sleeve opposite to that having said conical face being provided with cam surfaces adapted to cooperate with said rollers, said cams emanating from points respectively in a plane perpendicular to the axis of said sleeves and developing to points in another plane parallel with the plane last referred to, said points marking the beginning and the termination of said cam surfaces, said cams being formed respectively with helical surfaces taken approximately at an angle of seven degrees to a plane perpendicular to the axis of said sleeve, indentures in the end of said sleeve between the points of the beginning and termination of the respective cam surfaces, such indentures being formed in the arc of a circle and adapted to receive said rollers when at rest before they start to rise on said cam surfaces, and permitting a complete separation of said conical faces, said second sleeve being of mass and weight sufficient to inherently present an inertia to any actuating force that may be directed to rotate the same due to the rotation of the bearing surface on which said sleeve is mounted, or actuating force due to the rotation of said rollers on the said cam surfaces, a driven member fixed to said driven shaft and provided adjacent its periphery with annular conical faces extending between said oppositely disposed conical faces and shaped to have line contact therewith, so that when said driven member is clamped between said conical faces, by reason of the rotation of the driving shaft, said driven member will partake of the rotary motion of the driving shaft, and when the driven shaft is caused to rotate faster than the driving shaft the driven member will be released.

8. In a combustion engine starter and a power transmission mechanism comprising a driving shaft and a driven shaft in parallel relation, said driven shaft being associated with a combustion engine, a driving mechanism mounted on the driving shaft comprising the following elements: a sleeve adapted to fit on said driving shaft and splined with respect thereto to permit an axial movement of the said sleeve on said shaft, and a rotary movement with said shaft, said sleeve having at one end thereof a section of greater diameter than the sleeve, said section having a driving face, a shaft carried by said sleeve perpendicular to the axis of the said sleeve at the end thereof opposite said enlarged section, two rollers mounted for rotation at the opposite ends of said shaft, said rollers adapted for cooperation with suitable cams hereinafter described, said sleeve having an external cylindrical bearing surface intermediate said enlarged section and said rollers, a second sleeve embracing said cylindrical bearing surface of said first mentioned sleeve and being free to rotate on said bearing surface and also to slide axially thereof, said second sleeve provided at one end thereof with a driving face, the said face of said first mentioned sleeve and the face of the second sleeve being oppositely disposed as driving faces adapted to cooperate with interposed driven faces forming part of a driven element hereinafter described, the end of said second sleeve opposite to that having said driving face being provided with cam surfaces adapted to cooperate with said rollers, said cam surfaces emanating from points respectively in a plane perpendicular to the axis of the said sleeves and developing to points in another plane parallel with said plane last referred to, said points marking the beginning and the termination of said cam surfaces, indentures in the end of the said sleeve between the points of the beginning and the termination of the respective cam surfaces, such indentures being formed in the arc of a circle and adapted to receive said rollers when at rest before they start to rise on said cam surfaces, and permitting a complete separation of the said driving faces, said second sleeve being of mass and weight sufficient to inherently present an inertia to any actuating force that may be directed to rotate the same due to the rotation of the bearing surface on which said sleeve is mounted, or actuating force due to the rotation of the said rollers on said cam surfaces, a driven member fixed to said driven shaft and provided adjacent its periphery with annular conical faces projecting between said oppositely disposed driving faces and shaped to have line contact therewith, so that when said driven wheel is clamped between the driving faces of the sleeves, by reason of the rotation of the driving shaft, said driven member will partake of the rotary motion of the driving shaft, and when the driven shaft, due to the operation of said combustion engine, is caused to rotate faster than the driving shaft, the driven member will be released.

Signed by me at Bridgeport, Conn., this 12th day of October, 1927.

ALEXANDER DOW.